UNITED STATES PATENT OFFICE.

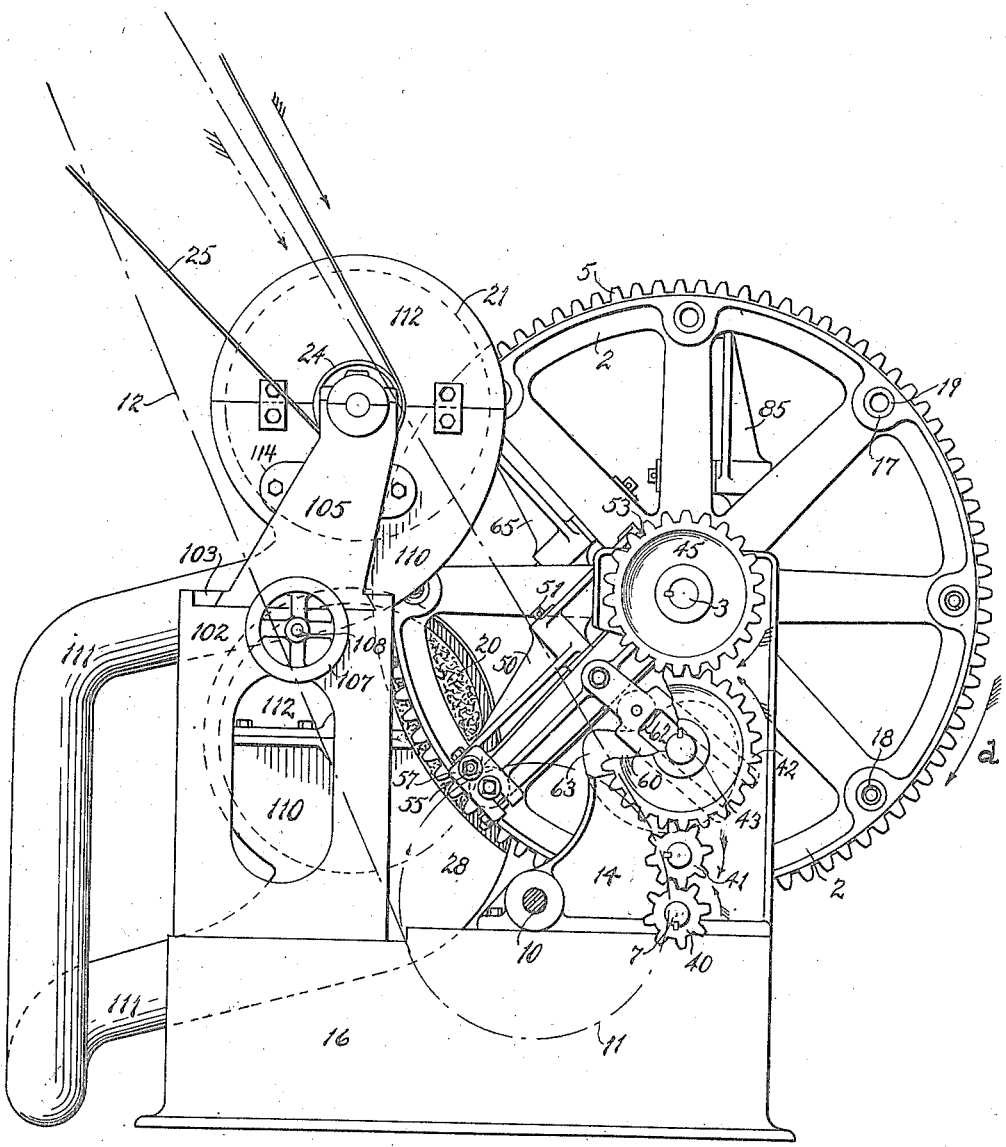

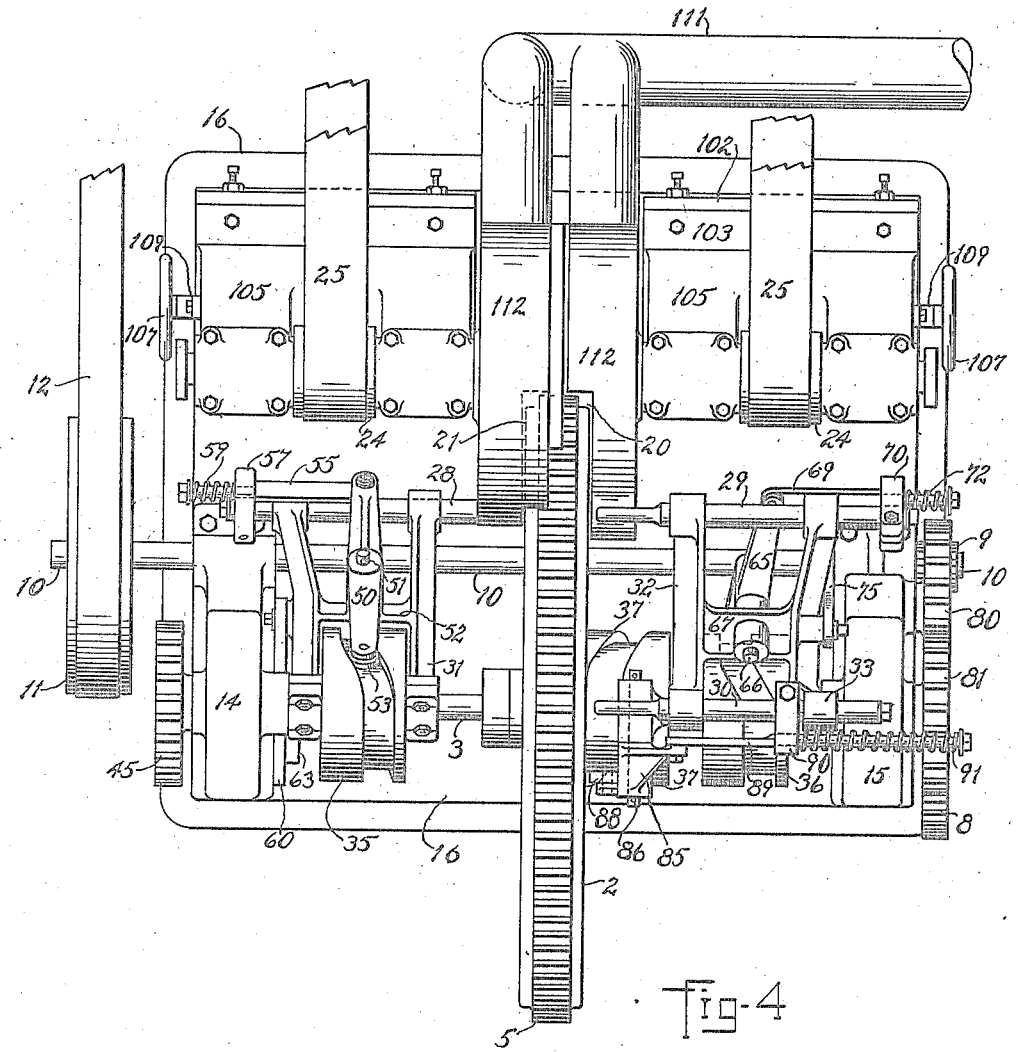

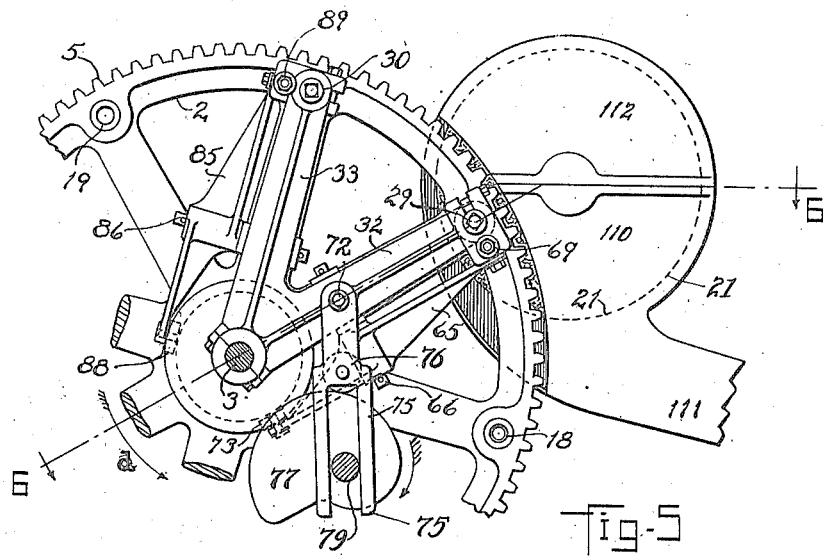
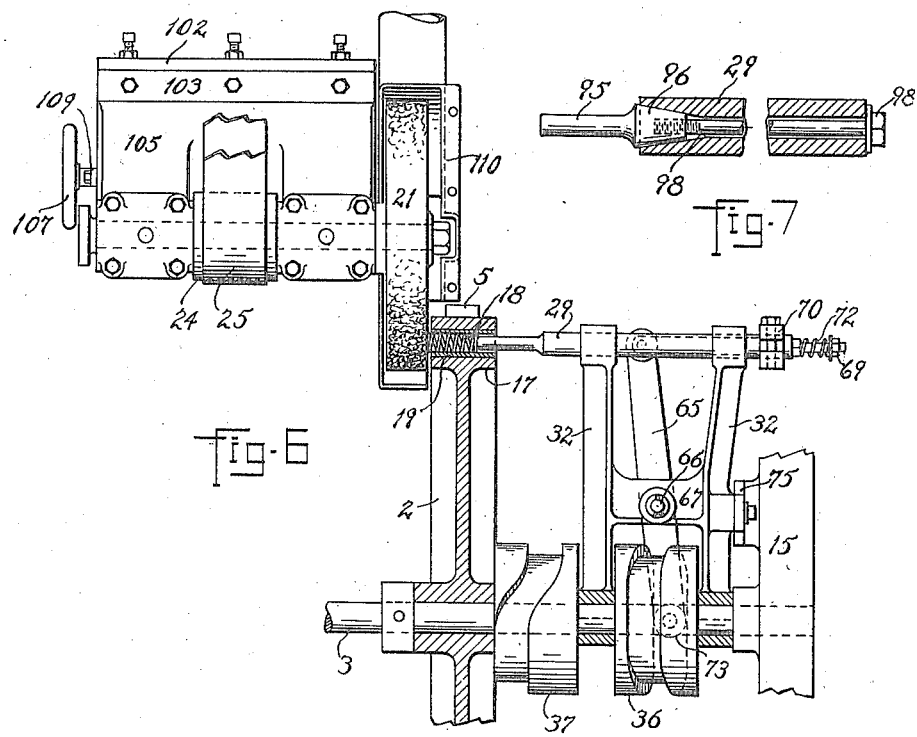

CHARLES H. ERICKSON AND JOHN P. NYSTROM, OF CLEVELAND, OHIO, ASSIGNORS TO CLEVELAND WIRE SPRING COMPANY, OF CLEVELAND, OHIO, A CORPORATION.

SPRING-GRINDING MACHINE.

1,164,336.

Specification of Letters Patent.

Patented Dec. 14, 1915.

Application filed May 23, 1914. Serial No. 840,417.

*To all whom it may concern:*

Be it known that we, CHARLES H. ERICKSON and JOHN P. NYSTROM, citizens of the United States, residing at Cleveland, in the county of Cuyahoga and State of Ohio, have invented certain new and useful Improvements in Spring-Grinding Machines, of which the following is a specification.

This invention relates to abrading or grinding machines, and comprises the improvements all substantially as herein shown and described and more particularly pointed out in the claims.

While not necessarily limited to the grinding of any one article, the present machine is particularly adapted to abrade or grind the opposite ends of spiral springs, and embodies mechanism for automatically bringing the opposite ends of each spring successively into engagement with a set of abrading wheels; and an automatic ejector discharges the finished springs.

The mechanism is also designed to convey the springs across the flat face of each abrading wheel so that uniform wear and a flat abrading surface and unvarying results will be maintained continually.

The machine also embodies means for adjusting the abrading wheels relatively to the carrier and holder for the springs, the object being to obtain true alinement and to compensate for wear in these parts.

Other features of construction involving other objects are also hereinafter set forth even in greater detail.

Figure 1:
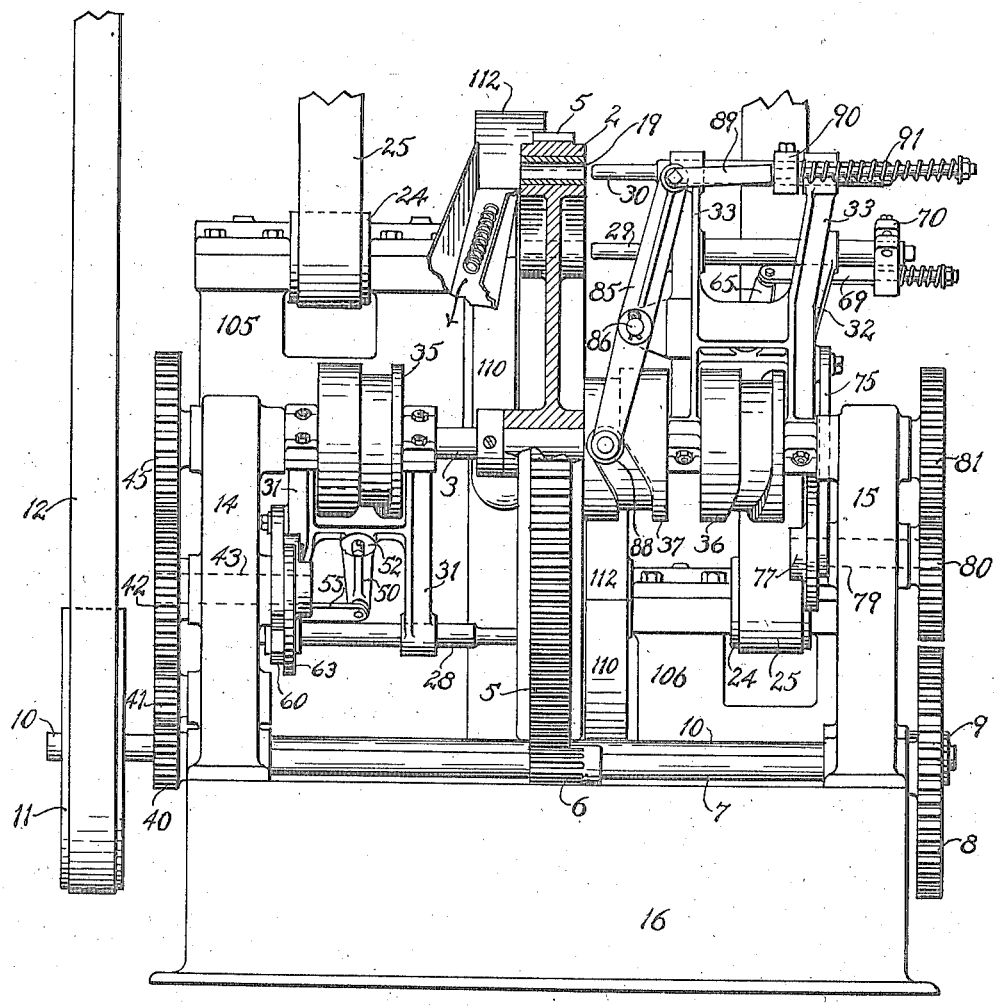
Figure 2:
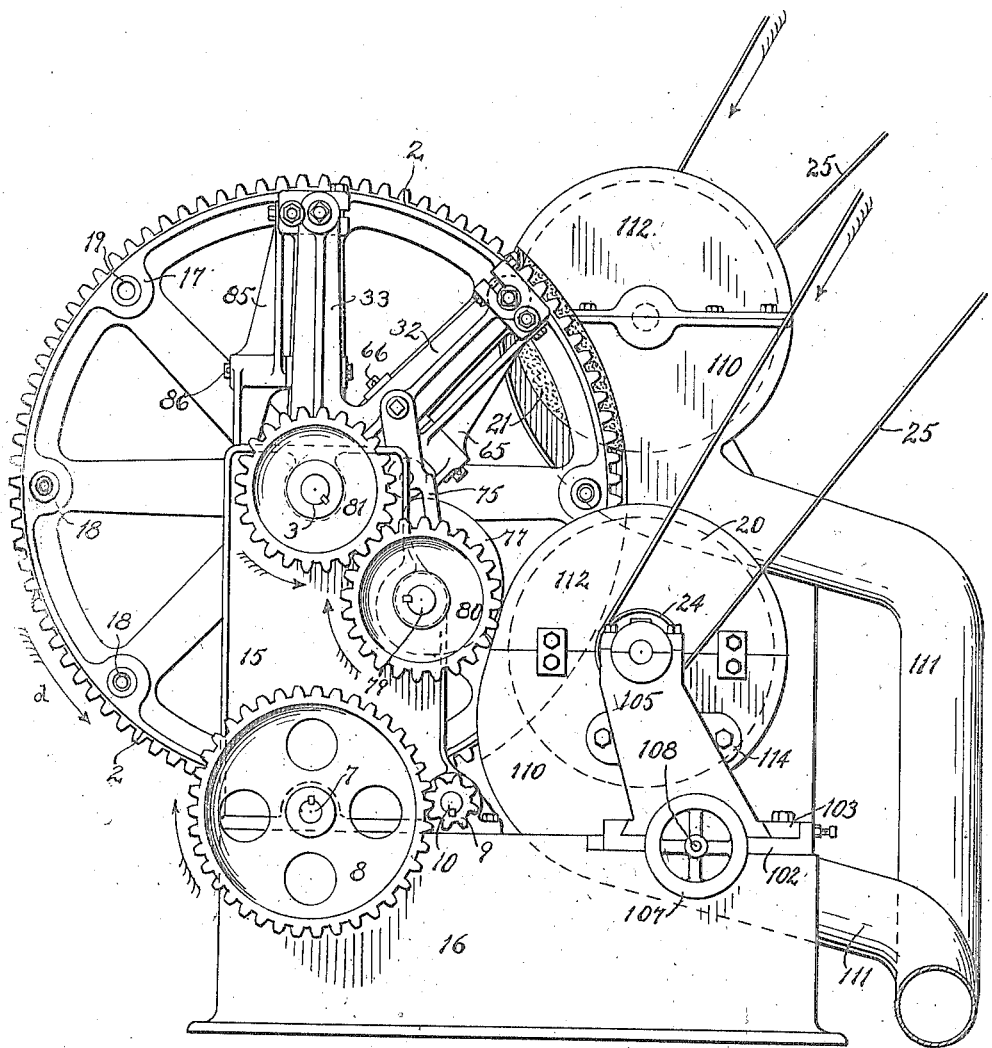
Figure 8:
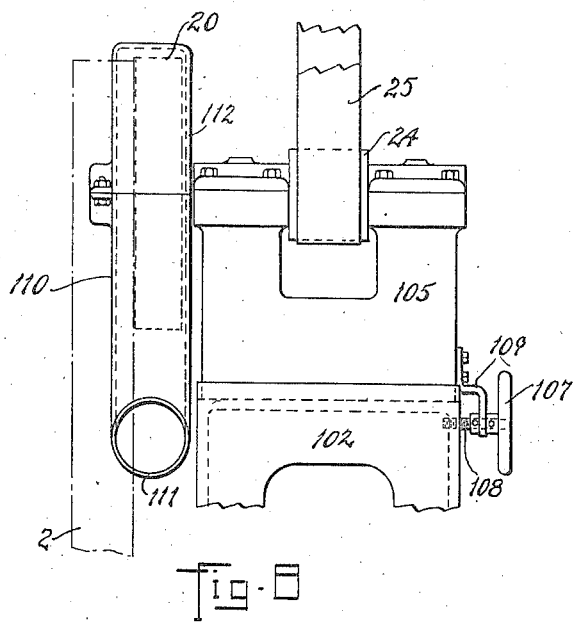
Figure 9:
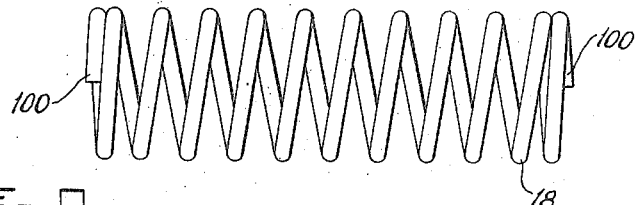
Figure 10:
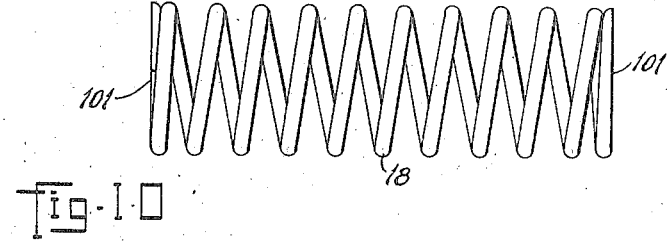

Now, referring to the drawings, which show one form of our machine; Figure 1 is a front elevation of a machine embodying our invention. Fig. 2 is an end elevation of the machine looking toward the right end of Fig. 1; Fig. 3 is an end elevation looking toward the left end of Fig. 1; Fig. 4 is a plan view of our machine; Fig. 5 is a side view of a portion of the rotary holder for the springs, showing the relative position of one abrading wheel with the means for holding the springs in grinding engagement therewith and also showing the ejector means for the springs; Fig. 6 is an irregular section on line 6—6, Fig. 5 through a portion of the rotary holder showing one abrading wheel and the means for pressing the spring against said wheel; Fig. 7 is an enlarged detail of one of the spring pressing plungers; Fig. 8 is a rear view of a top portion of the machine showing the adjustable support for one of the abrading wheels; Fig. 9 is a side elevation of a coiled spring before its ends are ground flat, and Fig. 10 shows the spring as it appears as it is ejected from the machine.

The machine in detail comprises a rotary holder 2 for the articles to be abraded, and this holder is in the form of a wheel which is loosely mounted on a shaft 3 and provided on its periphery with gear teeth 5 adapted to mesh with a pinion 6 on a second shaft 7 in the base of the machine. A gear 8 on one end of shaft 7 meshes with a gear 9 keyed on the end of a power shaft 10, having a pulley 11 to which the power is applied by a belt 12, see Fig. 1. The several shafts 3, 7, and 10 are journaled at their ends in uprights 14 and 15 forming portions of the frame or base 16 of the machine. The rotary holder 2 is preferably made with a wide rim having bosses 17, containing removable bushings 19 which are adapted to receive and confine the coiled springs 18 to be ground and the mechanism shown is particularly arranged to grind the opposite ends of such springs successively. Grinding is accomplished by a pair of abrading wheels 20 and 21 located on opposite sides of the rim of the rotary holder 2, and wheel 20 is mounted below and wheel 21 above the horizontal axis of the rotary holder on separate shafts carried by separate slidable supports 105, hereinafter described. Separate pulleys 24 and belts 25 drive the abrading wheels at any predetermined speed.

In operation the springs to be ground are slidably carried in the bushings 19, and as holder 2 is rotated in the direction indicated by the arrows *d*, each spring 18 is first brought opposite the abrading wheel 20 and is pressed into engagement therewith by a reciprocating plunger 28, Fig. 1. Just before the spring passes off abrading wheel 20, the plunger 28 relieves the pressure thereon, and the spring is then carried by rotary holder 2 into engaging position with the second abrading wheel 21, and a second plunger 29 on the opposite side of holder 2 is projected into the bushing 19 and presses the spring in an opposite direction against the flat side of wheel 21, after which the spring is ejected from its bushing by means of a third plunger 30. The spring pressing plungers 28 and 29 are slidably carried for independent movement on the outer ends of the separate oscillating arms 31 and 32 which are each loosely journaled on the shaft 3, but on opposite sides of the rotary holder 2, see Figs. 4 and 6. The ejector plunger 30 is also slidably mounted in an arm 33 which is rigid or integral with arm 32 but in a different radial position in respect thereto, see Figs. 4 and 5. Each of these three plungers is adapted to be brought into pressing engagement with the spring 18 at the proper time by suitable levers hereinafter described. These levers are oscillated by separate cams 35, 36 and 37 respectively, fixed on shaft 3 which is driven by a train of gears (see Fig. 3) comprising a small gear 40 on the end of shaft 7, idler gears 41 and 42 mounted on stud shafts 43 journaled in upright 14, and a gear 45 keyed on the end of the shaft 3. The spring holder or carrier 2 rotates continually and makes one-eighth of a revolution while the cam shaft 3 is given one complete rotation by the gearing described. The springs 18 are placed in bushings 19 by hand and when each spring is carried opposite the abrading wheel 20 by the rotation of the holder 2 it is brought first of all directly opposite the plunger 28, which is timed to slide into the bushing 19 to press the spring into grinding engagement with the flat face of wheel 20, such action being obtained by a lever 50, mounted on a pivot pin 51 in cross bar 52 of the arm 31 carrying the said plunger, see Fig. 4, and the lever having a roller 53 at one end operating in a cam 35. The opposite end of the lever 31 is pivotally connected with the plunger by a link 55, having a reduced portion slidably extending through an eye in an adjustable clamp 57 which grips the shank of the plunger; and a helical spring 59 is interposed between clamp 57 and a nut and washer on said reduced portion of the link to accommodate any check or irregularity in the operation of the plunger.

The arm 31 necessarily moves with holder 2 after the plunger 28 enters bushing 19, but to insure the plunger registering with the successive bushings and to effect a starting oscillatory movement of the arm 31 corresponding to the rotation of the holder 2, we pivotally connect a yoke 60 with said arm, (see Fig. 3) and cause a roller 62 on said yoke to be engaged by a cam 63 on stub shaft 43. The gears 42 and 45, are preferably of the same size so that the cam 63 will be driven at the same speed as the cam 35.

While the spring is being carried onward by the rotation of the holder 2 it is also being pressed against the flat face of the abrading wheel 20 and necessarily it describes an arc across said face but as the wheel 20 is rapidly revolving the grinding surface involved includes the entire flat face of the wheel from its circumference to a point inward therefrom as fixed by the arc movement of the spring. But the pressure on the spring is relieved just as the spring is about to pass off the abrading wheel 20, and the plunger is then withdrawn from the bushing and the arm 31 allowed to drop back by gravity to the position shown in Fig. 3, the roller 63 riding down an idle portion of the cam 63—after this cam has made a complete rotation. At this point, the plunger is again in position to engage the next successive spring and bring it into engagement with the same abrading wheel as just described. The cam 35 is shaped to draw the plunger 28 out of the bushing at the proper time and an idle portion on this cam allows a return movement of the arm 31 while the plunger is in a retired position.

After grinding one end of the spring as described, the spring is bodily carried upward into end grinding relations with the second abrading wheel 21 but on the opposite side of holder 2 to grind the opposite end of the spring in the same way by pressing the spring against the flat face of wheel 21 by means of plunger 29 and a lever 65 which is secured by a pivot bolt 66, on the cross bar 67 of the arm or arms 32, see Fig. 6. Lever 65 has a roller 73 on its inner end engaged with cam 36 and shaft 3 and a link 69 pivoted at its outer end which extends slidably through a clamp 70 on the shank end of the plunger. A yielding connection for the plunger 29 is obtained by interposing a coiled spring 72 between clamp 70 and a nut and washer on the end of the reduced portion of the link 69, see Fig. 4.

By referring to Fig. 5, it will be seen that the arms 32 and the plunger 29 are oscillated by a yoke 75 pivotally connected to one of the arms at 72, said yoke having forked ends slidably engaged with a shaft 79 carried by the frame member 15, and carrying a roller 76 engaging a cam 77 on shaft 79. This shaft is driven by a gear 80 meshing with the gear 81 on the end of the shaft 3, see Fig. 2, and these gears are of the same size so that the cam 77 will be given one rotation while the cam 36 is given one rotation, and cam 36 is provided with an idle portion which allows the return movement of the oscillating arms 32 while holding the plunger stationary.

After each spring has been ground at both ends and has finally moved past abrading wheel 21, it is ejected from holder 2 by plunger 30 which is operated by a lever 85 pivoted at 86 on a projecting ear rigid with one of the arms 33, see Fig. 1. A roller 88 on the lower end of lever 85 rides in a slot in the cam 37 and the outer end of the lever is connected with a link 89 having a stem slidably extending through a clamp 90 on plunger 30 and carrying a coiled spring 91 which is interposed between this clamp and a nut at the outer end of the stem link 89 to afford a yielding backing for the plunger 30.

The arms 33 and 32 are preferably united and jointly movable but spaced apart at their outer ends so that the plungers 29 and 30 are adapted to register with any two successive bushings 19 in the rotary holder 2, thereby causing each finished spring to be ejected while the holder 2 revolves and other springs are being ground by the abrading wheels.

The adjustable clamps 57, 70 and 90 permit different settings of the plungers relatively to the holder 2 and the springs 18 therein, thereby adapting any predetermined pressure to be applied to the springs in grinding operations, and also permitting adjustments to be made for grinding springs of different lengths. If any one of the plungers is prevented from entering its proper bushing due to the spring being improperly positioned in the bushing or for any other reason, the cushioning springs on the stem portion of the links allow the levers to move without distorting or injuring any part. The cams which operate the plunger levers are so formed that pressure is brought to bear on the springs 18 immediately after each spring reaches the nearest edge of each abrading wheel, and this pressure is released therefrom just as the spring is passing off the edge of the wheel. The path of the springs across the side faces of each of the abrading wheels, is that of an arc across a circular face. This tends to wear the abrading surfaces in a plane parallel to the plane of movement of the rotary holder 2 because this movement is equivalent to a radial movement inwardly and outwardly on the side face of each abrading wheel. It will also be noted in this connection, that the side of the rim of the rotary holder 2 is in juxtaposition and may even contact with the faces of the abrading wheels to face this surface nearer the center of the wheel and provide for a constant flat abrading surface, thereby insuring the ends of the spring being ground or faced off absolutely flat and at substantially right angles to the axis thereof. The sides of the rim of the rotary holder 2, however, are very gradually worn away by the abrading action, and therefore the rim is made preferably wider than the gear teeth 5 to accommodate such wear, and if desired, replaceable face plates may be used to take the wear.

Springs of various diameters may be ground in this machine as the bushings 19 are removable and interchangeable with bushings of other diameters, and to accommodate such changes the plungers are each provided with a removable end portion 95 having a tapered shank 96 fitting into a corresponding socket in the end of the plunger and held in position by a bolt 98 extending through the plunger, see Fig. 7. Whether the spring be small or large in diameter the spring is rigidly supported or engaged throughout its entire length within its bushing, and is held at exactly right angles to the abrading surface, and the ends of the spring will be ground flat at exactly right angles to the axis thereof, substantially as shown at the ends 101 of the spring 18 in Fig. 10. Fig. 9 shows the terminals 100 of the spring as they appear before being ground.

To compensate for wear on the abrading wheels, each wheel 20 and 21 is carried by a short shaft journaled in a suitable support 105 which is mounted in a dove-tailed slide 102 having a gib member 103, and a suitable hand wheel 107, and screw 108 serves to move the support 105 transversely of the machine to bring the abrading wheel into any desired working relation with the rotary holder 2, connections being by an arm 109 projected from the support 105 into engaging relations with two collars on the screw 108 which is in threaded engagement with the fixed member 102 of the frame of the machine. The abrading wheels may be removed from their arbors and replaced in reverse position after one side of either abrading wheel is worn.

The flying particles thrown off from the abrading wheels are caught within suitable housings comprising a bottom section 110 having a pipe extension 111 adapted to make a connection with a suction blower, and a top section 112 serving as a removable cover. The said housings are bolted to the slidable supports 105 through ears 114, see Figs. 2 and 3, and each housing is cut away in part as shown, to clear the rotary holder 2.

In operation, the articles to be abraded, for example the springs 18, are inserted within the bushings 19 at the front of rotary holder 2 immediately after the finished article is ejected therefrom and feeding of the springs to the holder may be performed by hand or by any suitable automatic mechanism.

What we claim is:

1. In a spring grinding machine, a rotary holder having cylindrical openings to confine helical springs, an abrading wheel on each side of said holder, reciprocable plungers arranged to register successively with each cylindrical opening, and means to operate said plungers to press the springs successively into engagement with said abrading wheels.

2. In a spring grinding machine, an abrading wheel, a rotary holder for the springs to be ground, an oscillating slide member and reciprocable plunger mounted thereon to press the springs against the abrading wheel face, and means for adjusting the abrading wheel laterally to compensate for the wear on its face.

3. In a spring grinding machine, an abrading wheel, a rotary holder having a rim provided with transverse openings to confine the springs to be ground, and means for adjusting said wheel laterally in respect to said holder to compensate for wear on said wheel, and means for rotating said holder.

4. In a spring grinding machine, a conveying device having replaceable bushings to hold the springs, in combination with a reciprocable plunger having a replaceable end member adapted to enter said bushings and engage the springs.

5. In a spring grinding machine, an abrading wheel, a rotary holder for the springs, a reciprocable plunger to engage the springs within the holder, and a spring-cushioned operating connection for the plunger adapted to yield when the plunger is checked in its spring-engaging movement.

6. In a spring grinding machine, an abrading wheel, a rotary holder for the springs, an oscillatory member at the side of said member, and separate cam and lever instrumentalities to operate said oscillatory member and reciprocable plunger co-actively with said rotary holder.

7. In a grinding machine for spiral springs, a carrying wheel having a series of transverse holes near its periphery, an abrading wheel at each side of said carrying wheel, said wheels adapted to operate successively on different ends of springs exposed in said openings, oscillating arms and plungers thereon adapted to enter said springs, means to oscillate said arms, and means to reciprocate said plungers to engage the springs in said openings.

8. In a grinding machine, a plurality of abrading wheels, a rotary holder having a plurality of cylindrical openings for the articles and bushings in said openings, said abrading wheel being on opposite sides of said holder and arranged to act successively, plungers to engage the articles carried in the said openings, and means to operate said plungers when the said articles are opposite the abrading wheels.

9. The combination with a rotary holder provided with transverse holes near its periphery adapted to carry small articles, of abrading wheels mounted on opposite sides of the said holder successively and pressing devices adapted to be moved transversely of the holder to engage and force the articles in the said openings first against one wheel and then against the other as they are carried past the said wheels.

10. In a spring grinding machine, a set of abrading wheels oppositely and successively related, a rotatable holder having transverse holes at intervals for springs to be abraded having gear teeth on its periphery, and devices to press the springs in opposite directions against said wheels successively.

In testimony whereof we affix our signatures in presence of two witnesses.

CHARLES H. ERICKSON.
JOHN P. NYSTROM.

Witnesses:
 FRANK VITCHA,
 P. W. HENRY.